US012240137B1

(12) United States Patent
Chiocca

(10) Patent No.: US 12,240,137 B1
(45) Date of Patent: Mar. 4, 2025

(54) CUTLERY TOOL AND HOLDER

(71) Applicant: Joseph B. Chiocca, Lakewood Ranch, FL (US)

(72) Inventor: Joseph B. Chiocca, Lakewood Ranch, FL (US)

( * ) Notice: Subject to any disclaimer, the term of this patent is extended or adjusted under 35 U.S.C. 154(b) by 408 days.

(21) Appl. No.: 17/709,596

(22) Filed: Mar. 31, 2022

Related U.S. Application Data

(60) Provisional application No. 63/172,498, filed on Apr. 8, 2021.

(51) Int. Cl.
*A45F 5/00* (2006.01)
*B26B 27/00* (2006.01)
*B26B 29/02* (2006.01)

(52) U.S. Cl.
CPC ................ *B26B 29/02* (2013.01); *A45F 5/00* (2013.01); *B26B 27/005* (2013.01); *A45F 2005/008* (2013.01)

(58) Field of Classification Search
CPC ......... B26B 29/02; B26B 27/005; A45F 5/00; A45F 2005/008
See application file for complete search history.

(56) References Cited

U.S. PATENT DOCUMENTS 2,164,623 A 7/1939 Posner
2,176,052 A 10/1939 Beyer
D317,730 S 6/1991 Mo
5,025,966 A 6/1991 Potter
5,196,818 A 3/1993 Anderson
5,213,240 A * 5/1993 Dietz .................. G01B 3/1071 224/678
5,333,767 A 8/1994 Anderson
D364,955 S 12/1995 Gringer et al.
D372,878 S 8/1996 Finnegan
5,593,073 A 1/1997 Finnegan
6,502,727 B1 1/2003 Decoteau
6,530,508 B1 3/2003 Devine
7,076,885 B2 7/2006 Potter
7,337,903 B2 * 3/2008 Lauri ........................ A45F 5/02 206/352
D663,115 S 7/2012 Hansen
10,173,334 B2 * 1/2019 Woolery .................. B26B 1/10
10,792,828 B2 10/2020 Woolery
2006/0016841 A1 1/2006 Shurm
2010/0095427 A1 4/2010 Romiti
2010/0289282 A1 11/2010 Avery, Jr. et al.
2013/0126541 A1 5/2013 Woolery
(Continued)

OTHER PUBLICATIONS

U.S. Appl. No. 29/832,979, Chiocca.

*Primary Examiner* — Omar Flores Sanchez

(57) ABSTRACT

A cutter and holder apparatus cuts an object. A body has a first side, a second side and an edge. An insert leg is coupled to the body. A channel is defined between the body and the insert leg for positioning the insert leg below the object and the object within the channel. A blade is coupled to the body and is positioned within the channel for cutting the object. A body link is coupled to the body. A base has a first side, a second side and an edge. A base link is coupled to the base. The body is positioned adjacent to the base and the body link couples with the base link for defining a removable couple and temporarily coupling the body with the base. A keeper is coupled with the base.

12 Claims, 22 Drawing Sheets

(56) References Cited

U.S. PATENT DOCUMENTS

| | | | | |
|---|---|---|---|---|
| 2014/0173914 | A1 | 6/2014 | Yu Chen | |
| 2020/0307861 | A1* | 10/2020 | Aviv | B65D 77/40 |
| 2021/0283760 | A1* | 9/2021 | Jacobs | B26B 5/00 |
| 2021/0308881 | A1* | 10/2021 | Votolato | B26B 5/00 |
| 2022/0040871 | A1* | 2/2022 | Spitz | B26B 27/005 |

* cited by examiner

CUTLERY TOOL AND HOLDER

CROSS-REFERENCE TO RELATED APPLICATIONS

This application claims benefit of U.S. Patent Provisional Application No. 63/172,498 filed Apr. 8, 2021. All subject matter set forth in Provisional Application No. 63/172,498 is hereby incorporated by reference into the present application as if fully set forth herein.

BACKGROUND OF THE INVENTION

Field of the Invention

This invention relates to cutlery and more particularly to an improved cutlery tool and holder.

Background of the Invention

Transported goods are routinely shipped in containers consisting of cardboard and secured closed by packing tape or the combination of the cardboard along with plastic wrap. In this way a plurality of goods may be shipped within a single container. Once the goods arrive at their destination, these goods require removing from the containers. Much time may be required for opening the containers before permitting access for the removal of the goods therein. A cutlery device may be utilized for cutting the cardboard, packing tape or the plastic wrapped in order to gain access into the container. In order to expedite the utility of the cutlery device, the cutlery device should be easily accessible between a usage and storage position in addition to cutting of the cardboard, packing tape and plastic wrap.

There have been many in the prior art who have attempted to solve these problems with varying degrees of success. None, however completely satisfies the requirements for a complete solution to the aforestated problem. The following U. S. Patents are attempts of the prior art to solve this problem.

U.S. Pat. No. 2,164,623 to Posner discloses means for holding hair pins comprising a horse shoe magnet, a non magnetic member having two opposed plates positioned over the inner periphery of the horse shoe substantially covering the same with a portion extending around the open end of the horse shoe substantially in line with the pole faces of the horse shoe magnet and joined to the said plates, a strap inserted between the face of the horse shoe magnet and one of said plates and means clamping said opposed plates against the faces of the horse shoe magnet.

U.S. Pat. No. 2,176,052 to Beyer discloses an implement holder comprising a supporting plate of non-magnetic material adapted to be carried on the wrist, and a permanent magnet mounted upon the supporting plate and having a flat upper side to which implements are held by the attraction of said magnet, said magnet being so arranged on the plate that the magnetic axis is crosswise of the wrist on which the plate is carried.

U.S. Pat. No. 5,025,966 to Potter discloses a magnetic tool holder for a tape measure or similar tool is provided with a belt loop for mounting on a user's belt. The holder has a receptacle portion in which is mounted an annular flat magnet. A flat keeper member of magnetic material is mounted on the tape measure. The keeper member and a central index knob are sized to nest within the receptacle and hole of the annular magnet in tight magnetic engagement yet allow easy removal. Protective shields and/or a dovetailed bracket may be provided to prevent accidental dislodgement and a secure mechanical mounting in addition to the magnet.

U.S. Pat. No. 5,196,818 to Anderson discloses a wrist mounted magnetic holder for small articles such as screws, nails, bolts, drill bits and the like having a non-ferrous material housing with a ceramic magnet polarized into two distinct regions and a flux concentrator for increasing the magnetic flux density at the holding surface.

U.S. Pat. No. 5,213,240 to Dietz et al. discloses an improved magnetic tool holder for tape measures is provided in which a spoked keeper plate is mounted on the tool to be held in the tool holder. This results in a uniform holding force around the circumference of the holder so that the tool can be securely held in the receptacle and can be readily and easily removed by application of a controlled force. The holding force can be varied by varying the number of spokes and the width of the spokes. A self-centering ring and receptacle is provided to produce an audible click when the tool is properly seated with the keeper plate in intimate contact with the magnet and pole piece.

U.S. Pat. No. 5,333,767 to Anderson discloses a wrist mounted magnetic holder for small articles such as screws, nails, bolts, drill bits and the like having a non-ferrous material housing with a ceramic magnet polarized into two distinct regions and a flux concentrator for increasing the magnetic flux density at the holding surface.

U.S. Pat. No. 5,593,073 to Finnegan discloses an improved workman's wrist band includes an elongated preferably rectangular, flexible resilient strip of woven cloth or the like having opposite end portions and a central portion. To the upper surface of one end portion of the strip is connected an adhesive patch bearing one of a) hooks and b) hook receptors. To the underside of the strip in the opposite end portion is connected an adhesive patch bearing the other of a) hooks and b) velcro-type hook receptors. The patches are used to enable the strip to be releasably affixed around the wrist of a workman. The band also includes a cushion connected to and depending from the underside of the central portion of the strip and having a permanent magnet disposed therein. The magnet releasably holds workman's items such as nails, screws and the like magnetically attracted by the magnet to the upper surface of the central portion of the band for easy access and use. The band is particularly useful for holding nails used in affixing horseshoes to equines. The magnet can be a circular disc or of a different shape and can consist of a plurality of magnetic units magnetically held together for articulation of the magnet for improved wrist comfort. The cushion can have an openable pocket for the magnet so that it can be removed and replaced as needed. The opposite ends of the band can be looped over the central portion of the band to cover nails and the like for transport.

U.S. Pat. No. 6,502,727 to Decoteau discloses a device and associated method for attaching an electronic device to a tether so that it cannot be stolen or inadvertently lost. The device includes a housing. Within the housing is contained a spool and a spring for rewinding the spool. A tether extends from the spool out of the housing. The tether terminates outside of the housing with a connector element. The connector element is selectively attachable to an electronic device. As the tether is wound on the spool, the connector element is drawn toward an attachment area on the housing of the device. The connector element and the attachment area are magnetically attracted. As such, when the connector element approaches the attachment area on the housing, the connector element becomes magnetically affixed to the attachment area, thereby joining the electronic device to the housing in a fixed orientation.

U.S. Pat. No. 6,530,508 to Devine discloses a magnetic utility wristband for holding magnetically attractable metallic work items there against for convenient access. The wristband includes an elongated flexible band sized in length to wrap around the wrist of a worker. End portions of the wristband include two-part releasably attachable hook and loop surfaces on corresponding overlapping inner and outer end portion surfaces whereby the band is releasably adjustably connectable only around the worker's wrist. A plurality of elongated magnetic bars are held along a central portion of the wristband in spaced substantially parallel relation one to another transversely to the length of the wristband and between the outer and inner flexible panels by a plurality of transverse spaced stitch lines connecting said outer and inner panels to form individual elongated pockets each of which hold and position one magnetic bar. By preferred alternating surface polarity of adjacent magnetic bars, the devices may be shortenable for small wrist sizes and fully collapsible in accordion fashion for storage.

U.S. Pat. No. 7,076,885 to Potter discloses a tool and tool holder with a permanent magnet mounted upon one and a magnetically permeable keeper on the other are provided with respective camming surfaces which are cooperatively engaged when the tool is rotated, breaking the magnetic attraction between opposing surfaces of the magnet and keeper to facilitate removal of the tool from the holder. A cup-like receptacle is mounted upon a body portion of the tool, disclosed in each of two embodiments as a flexible, metal measuring tape contained within a hollow housing, and one of the magnet and keeper is disposed within this receptacle. The camming surface on the tool comprises convex protrusions within the receptacle in a first embodiment, and protrusions extending outwardly from the periphery of the receptacle in a second embodiment. A recess is formed in a surface of the holder to receive the receptacle on the tool when the latter is releasably mounted upon the holder. The other of the magnet and keeper, as well as the camming surface on the holder, is disposed within the recess. A receiver and indicator may be attached to or integrally formed in the tool, to be activated by a signal from a transmitter, which may be attached to or integrally formed in the holder. When activated, the indicator provides a visible or audible indication to aid in locating the tool when it is separated from the holder. Belt loops and a pencil holder may be integrally formed with the holder body portion.

U.S. Pat. No. 7,337,903 to Lauri discloses a razor blade holder includes a slotted housing for removably retaining a razor blade therewithin. The housing accommodates at least one magnet. The housing is used conjointly with a keeper having a magnet affixed thereto. The housing and keeper, in use, sandwich a portion of a garment therebetween to provide easy and safe access to a razor blade. The magnets used herein are preferably neodymium magnets. Also, the present invention is particularly adapted for use with a single edge razor.

U.S. Pat. No. 10,173,334 to Woolery discloses a utility knife includes a body with a knife blade storable within the body and one or more magnets coupled to the knife body. The magnets are able to be embedded within the body or embedded with an adapter that is configured to removably couple with the utility knife. In some embodiments, the knife blade folds out from a side of the body and into an operable position. Alternatively, in some embodiments, the knife blade slides out of a top of the body and into the operable position. The utility knife is able to magnetically couple with a base having a magnetically attractable surface. The utility knife is securable to the base in a vertical orientation and a horizontal orientation.

U.S. Pat. No. 10,792,828 to Woolery discloses a utility knife includes a body with a knife blade storable within the body and one or more magnets coupled to the knife body. The magnets are able to be embedded within the body or embedded with an adapter that is configured to removably couple with the utility knife. In some embodiments, the knife blade folds out from a side of the body and into an operable position. Alternatively, in some embodiments, the knife blade slides out of a top of the body and into the operable position. The utility knife is able to magnetically couple with a base having a magnetically attractable surface. The utility knife is securable to the base in a vertical orientation and a horizontal orientation.

U.S. Pat. D317,730 to Mo discloses an ornamental design for a combined magnetic holder with arm band.

U.S. Pat. D364,955 to Gringer et al. discloses an ornamental design for a tool and parts holder.

U.S. Pat. D372,878 to Finnegan discloses an ornamental design for a workman's magnetic wrist band for holding small metal objects.

U.S. Pat. D663,115 to Hansen discloses an ornamental design for a magnetic tool holder.

United States Patent Application 2006/0016841 to Shurm discloses a magnetic arm band including a top sheet of material, a bottom sheet of material, a two dimensional array of magnets positioned between the two sheets of material and stitching to encase each magnet in an individual pocket. Two cinch straps on the band allow the band to be worn on the limb of a user. A stiff sheet of material is used to retain the shape of the band. The magnets may be magnetized after assembly.

United States Patent Application 2010/0095427 to Romiti discloses a magnetic holder with a front side to gather implements, and a backside for removable attachment incorporated into a utility shape that is controlled by handle which operates like a lever for removable attachment to base located thereon a wristband or a glove for the hobbyist or professional craftsmen engaged in fabrication of finished goods or commodities.

United States Patent Application 2010/0289282 to Avery, Jr. et al. discloses a system for retaining an implement adjacent a person's hand. The system includes a band (such as a wrist band or finger ring), and a magnet attached to the band. A metal portion surrounds at least a portion of on the implement, making the implement removably engagable with the system.

United States Patent Application 2013/0126541 to Woolery discloses a system for holding an item comprises a magnetic item comprising one or more magnets and a universal base comprising a magnetically attractable surface and for removably coupling with the magnetic item. In some embodiments, a shape of the one or more magnets is selected from a set comprising a strip, a ball bearing and a disc. In some embodiments, at least one of the one or more magnets comprise one or more of a neodymium magnet and a ceramic magnet. In further embodiments, the magnetic item is a holder comprising an aperture for receiving an additional item. In some embodiments, the universal base removably couples with an additional article. In some embodiments, the magnetic item is a tape measure. In further embodiments, the magnetic item and the universal base comprise interlocking geometry.

United States Patent Application 2014/0173914 to Yu Chen discloses a cutter including a main body and a cutting unit. The main body is lengthwise defined to have a dispensing section, a holding section and a storage section in sequence. The holding section is gradually contracted toward two ends and defined to be a stop portion, and the storage section is bored with a through hole. The cutting section has one side formed with a pointed end and another side provided with a cutting edge. The main body is integrally covered on the cutting unit, leaving the pointed end and the cutting edge exposed and letting the pointed end located at a central upper edge of the dispensing section. By so designing, the cutter of this invention can easily cut off and remove various kinds of packaging members, able to elevate efficiency of removing packaging members from a packing box and integral in functional design.

Although the aforementioned prior art have contributed to the development of the art of cutlery tools and holders none of these prior art *patens* have solved the needs of the art.

Therefore, it is an object of the present invention to provide an improved cutlery tool and holder for cutting an object.

Another object of this invention is to provide an improved cutlery tool and holder that is easily positioned and retrieved from a storage position.

Another object of this invention is to provide an improved cutlery tool and holder that is easily transported.

Another object of this invention is to provide an improved cutlery tool and holder that is easily utilized by an operator.

Another object of this invention is to provide an improved cutlery tool and holder that is cost effective to produce.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved cutter and holder apparatus for cutting an object comprising a body having a first side, a second side and an edge. An insert leg is coupled to the body. A channel is defined between the body and the insert leg for positioning the insert leg below the object and the object within the channel. A blade is coupled to the body and is positioned within the channel for cutting the object. A body link is coupled to the body. A base has a first side, a second side and an edge. A base link is coupled to the base. The body is positioned adjacent to the base and the body link couples with the base link for defining a removable couple and temporarily coupling the body with the base. A keeper is coupled with the base.

In another embodiment of the invention, the body includes a body key. The base includes a base receptacle. The body key engages with the base receptacle for defining an alignment platform. The alignment platform aligns the body with the base and positions the body link proximate to the base link.

In another embodiment of the invention, the body includes a body protruded surface. The base includes a base recessed surface. The body protruding surface abuts with the base recessed surface for positioning a portion of the body within the base and defining a low profile exterior surface.

In another embodiment of the invention, a groove is in the base. The groove defines a cavity between the body and the base during engagement of the body with the base. The cavity receives a portion of the body for elevating a portion of the body from the first side of the base and allows grasping of the body.

In another embodiment of the invention, a preventer is coupled to the base and extends into the cavity. The preventer contacts the body and inhibits the body to be depressed into the cavity in proximity to the preventer for preventing inadvertent disengagement between the body from the base.

In another embodiment of the invention, the keeper includes a band.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
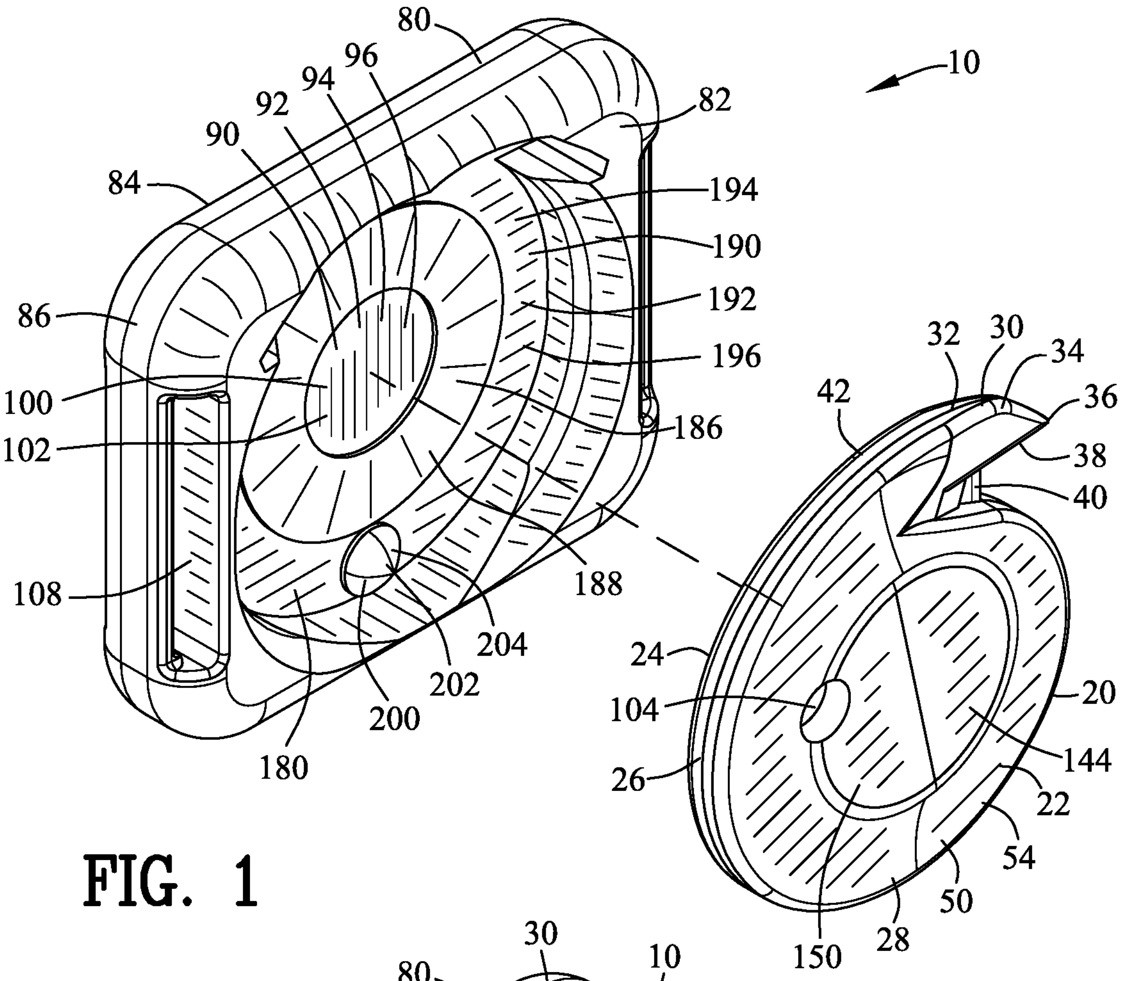
FIG. 1 is an exploded isometric view of a body and a base incorporating the present invention.
Figure 2:
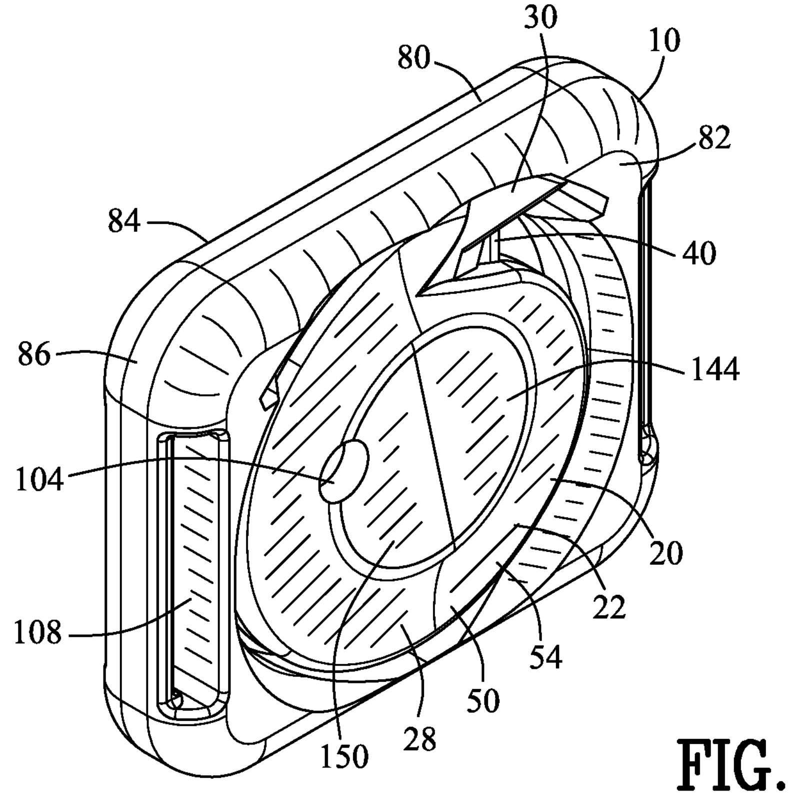
FIG. 2 is a view similar to FIG. 1 illustrating the body engaging with the base.
Figure 3:
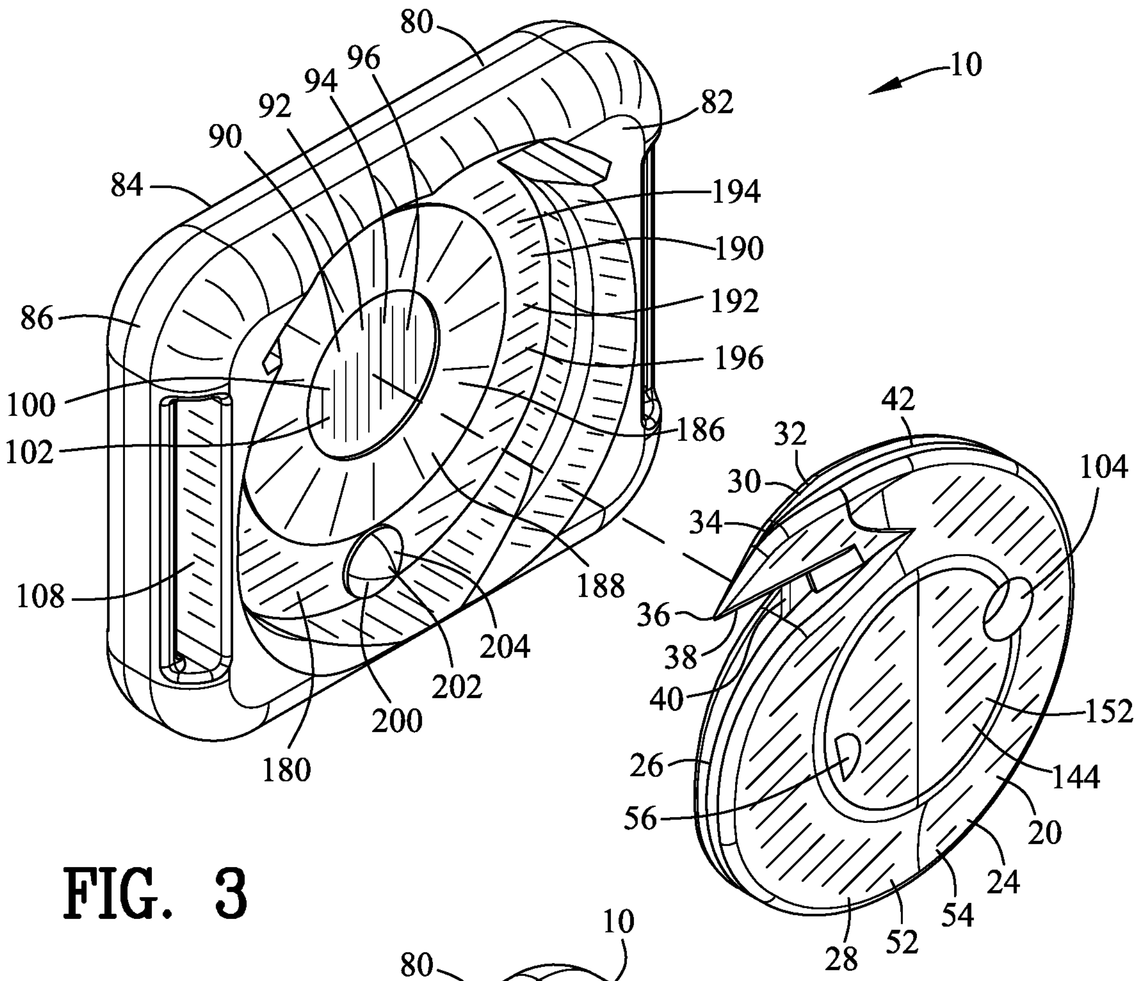
FIG. 3 is a view similar to FIG. 1 illustrating the body in a second orientation relative to the base.
Figure 4:
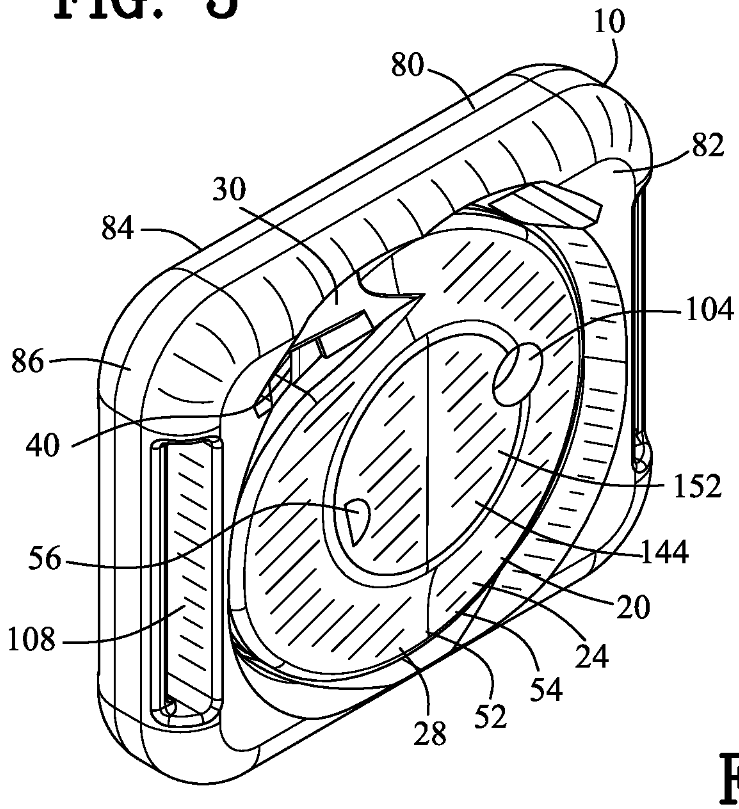
FIG. 4 is a view similar to FIG. 3 illustrating the body engaging with the base.
Figure 5:
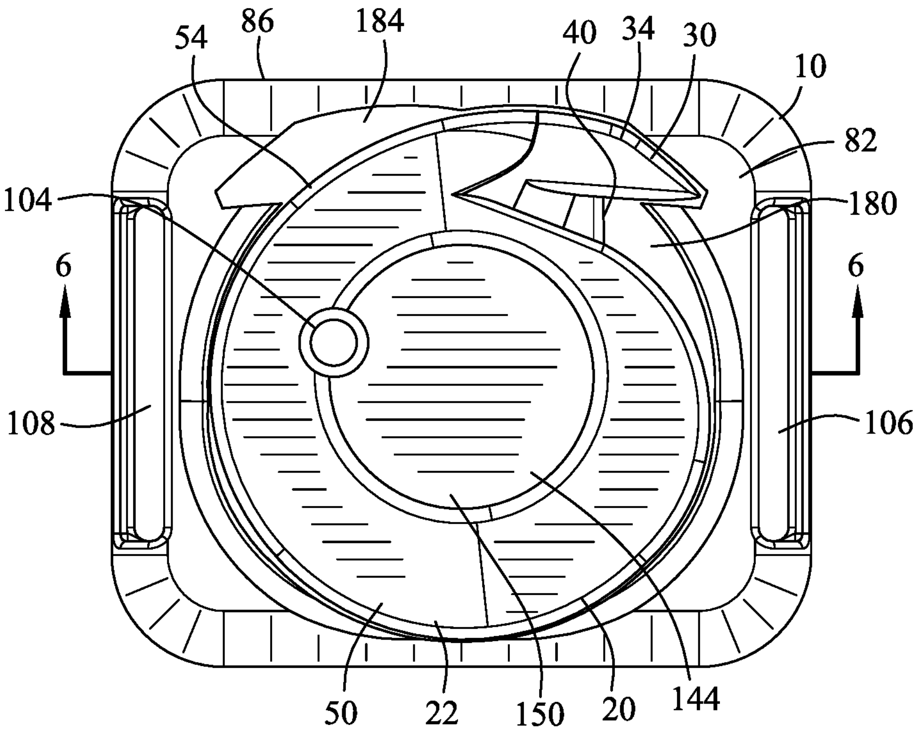
FIG. 5 is a front view of FIG. 2.
Figure 6:
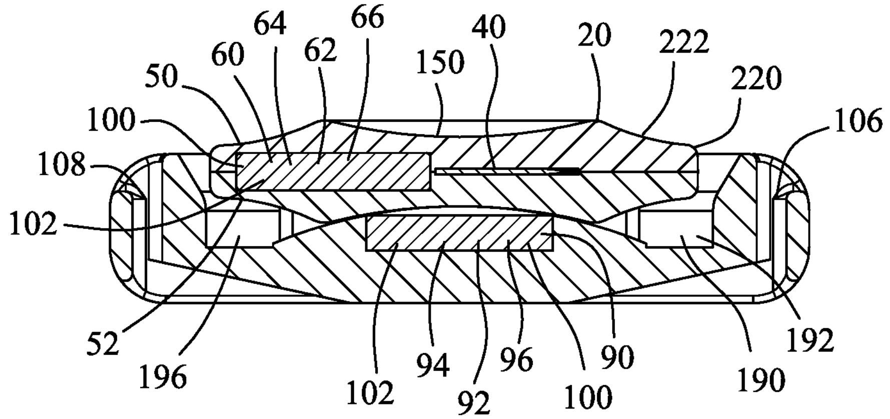
FIG. 6 is a sectional view along line 6-6 in FIG. 5.
Figure 7:
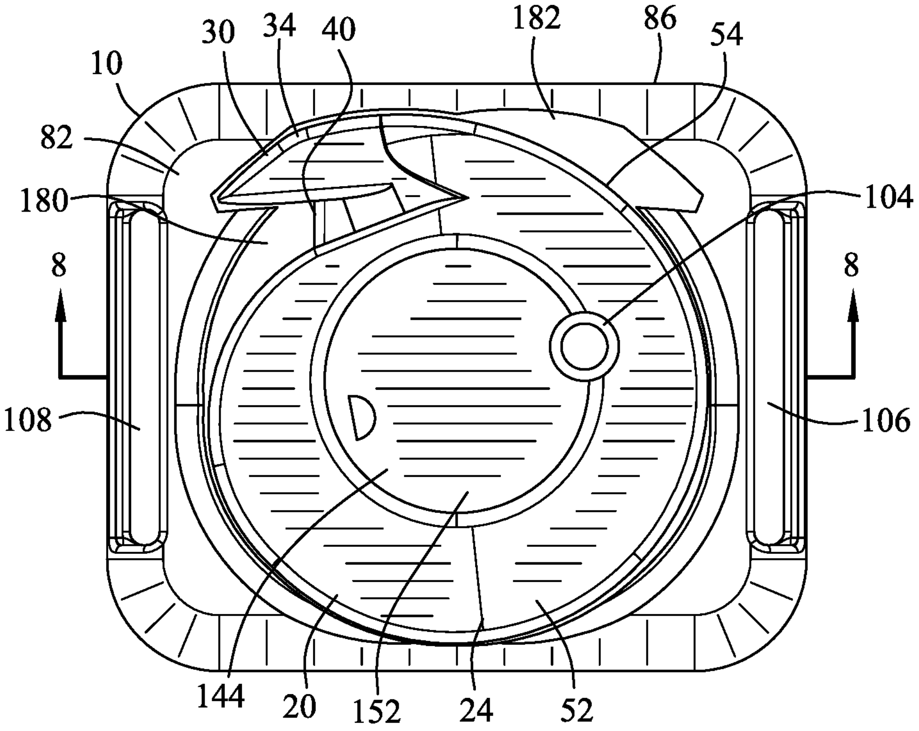
FIG. 7 is a front view of FIG. 4.
Figure 8:
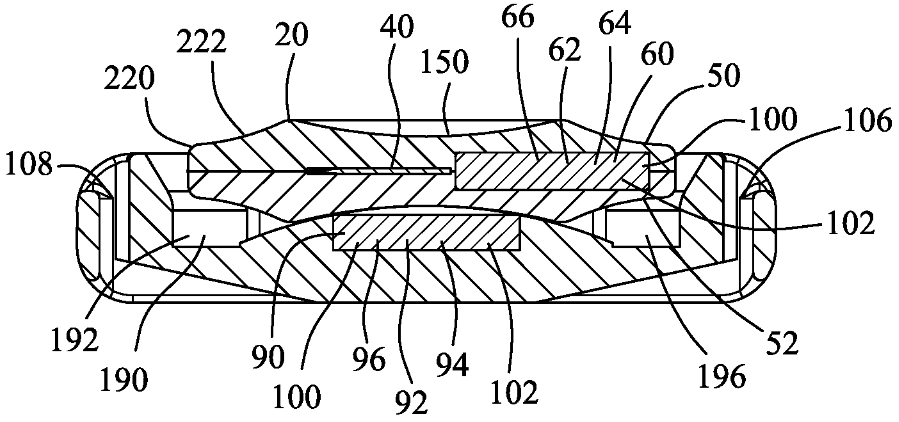
FIG. 8 is a sectional view along line 8-8 in FIG. 7.
Figure 9:
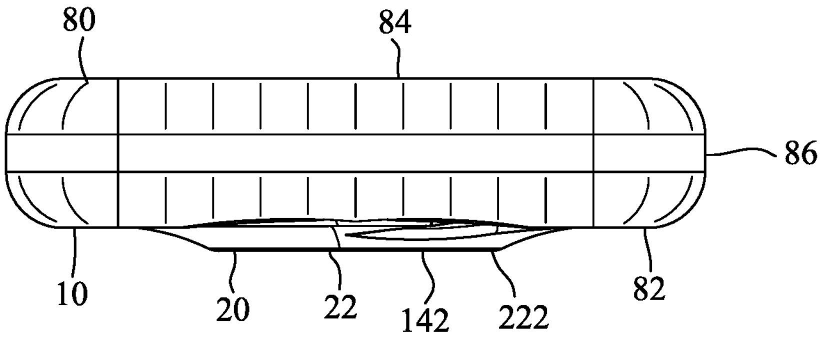
FIG. 9 is a top view of FIG. 2.
Figure 10:
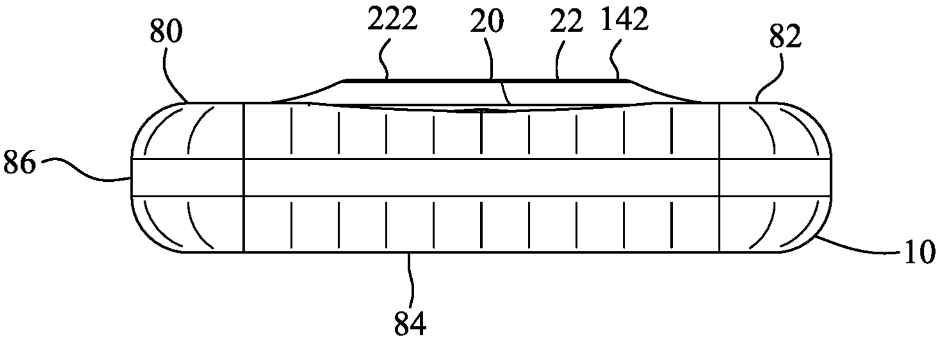
FIG. 10 is a bottom view of FIG. 2.
Figure 11:
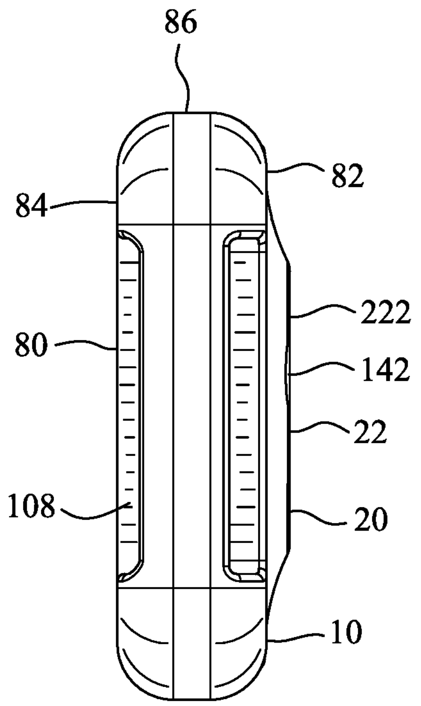
FIG. 11 is a left side view of FIG. 2.
Figure 12:
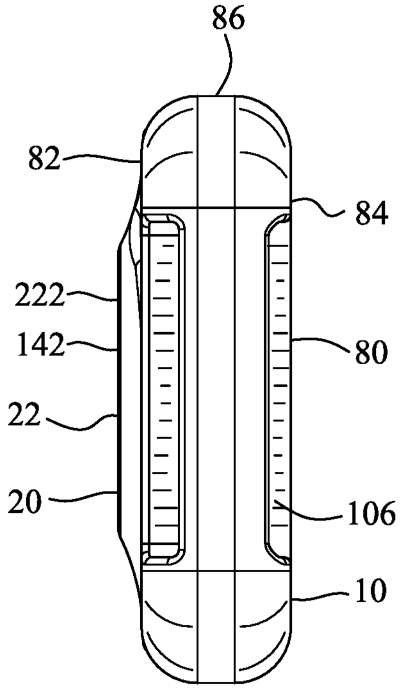
FIG. 12 is a right side view of FIG. 2.
Figure 13:
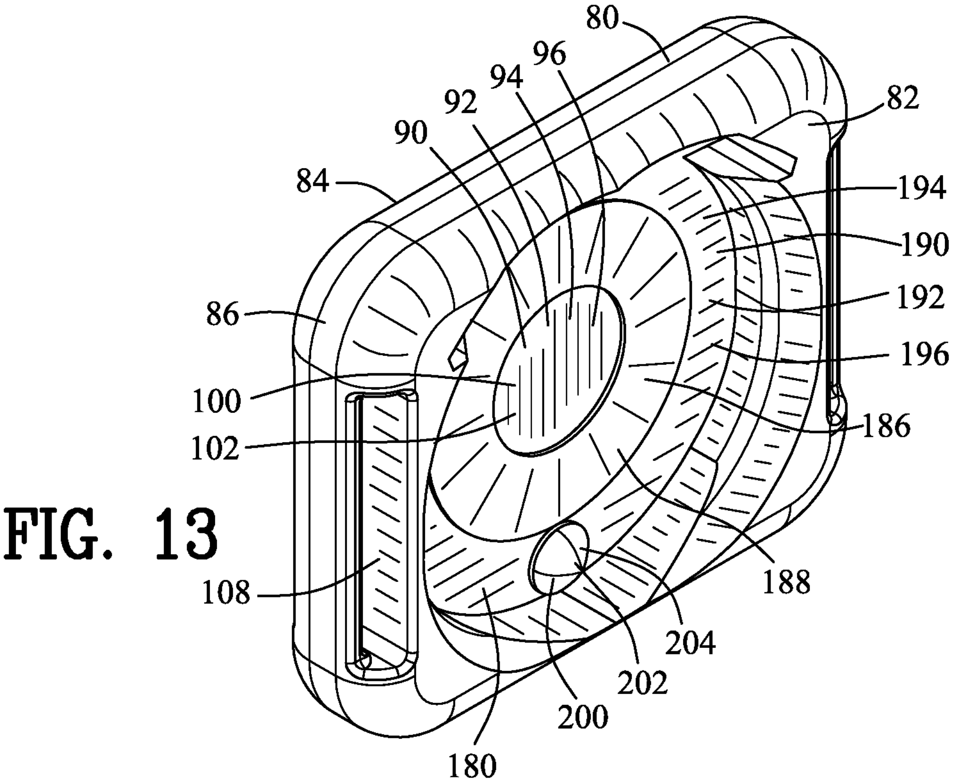
FIG. 13 is an isometric view of the base in FIG. 1.
Figure 14:
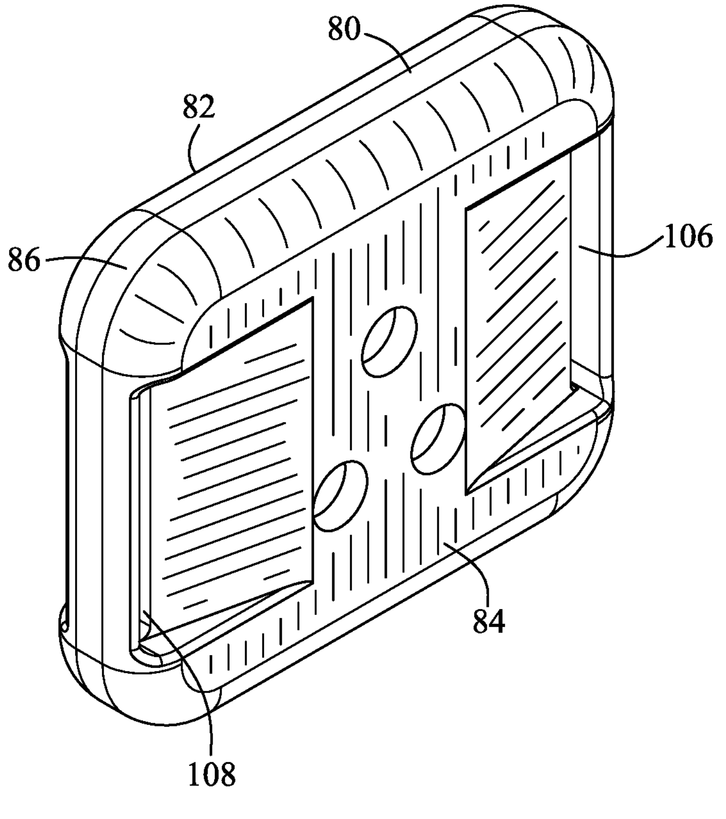
FIG. 14 is a rear isometric of FIG. 13.
Figure 15:
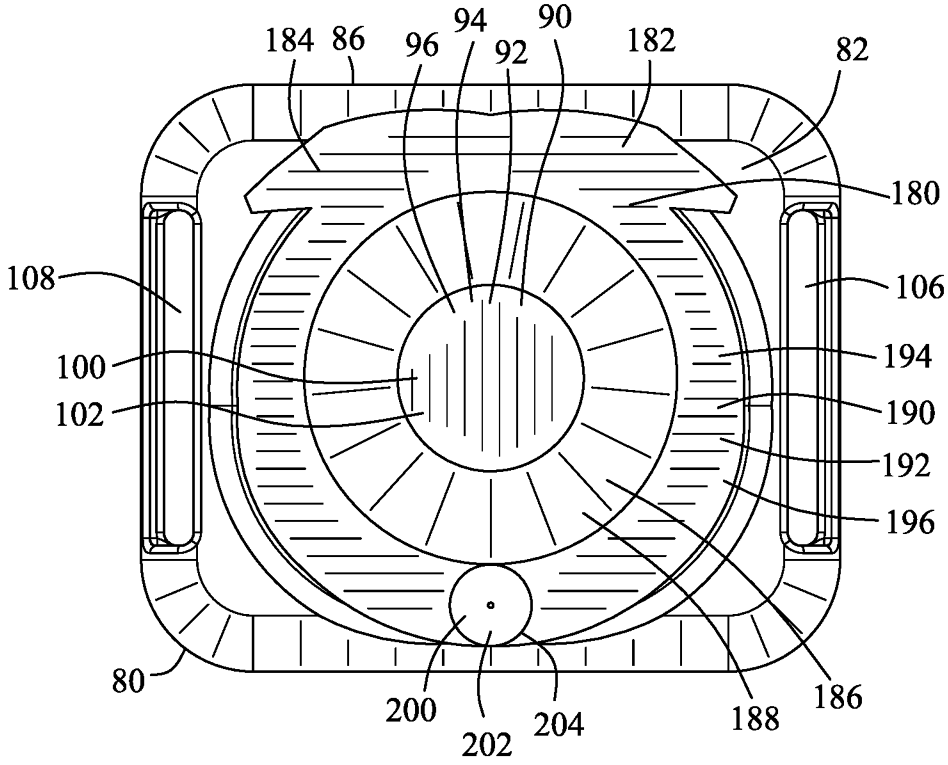
FIG. 15 is a front view of FIG. 13.
Figure 16:
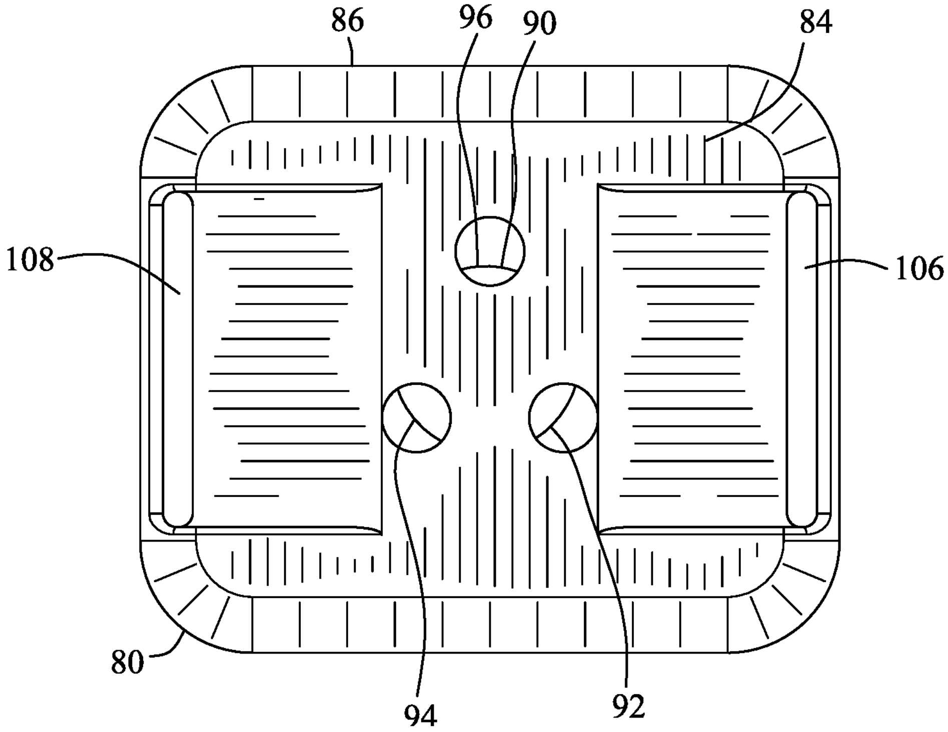
FIG. 16 is a rear view of FIG. 13.
Figure 17:
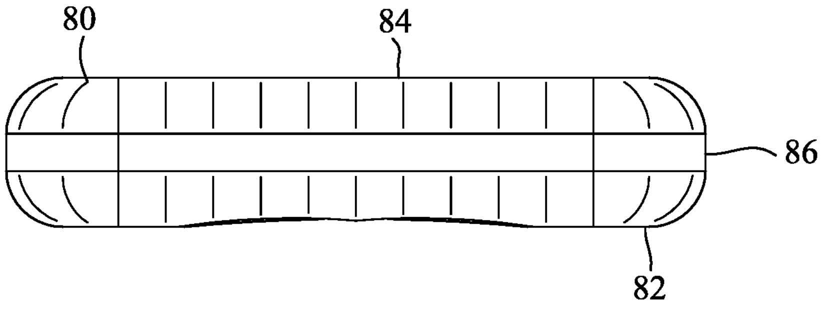
FIG. 17 is a top view of FIG. 13.
Figure 18:
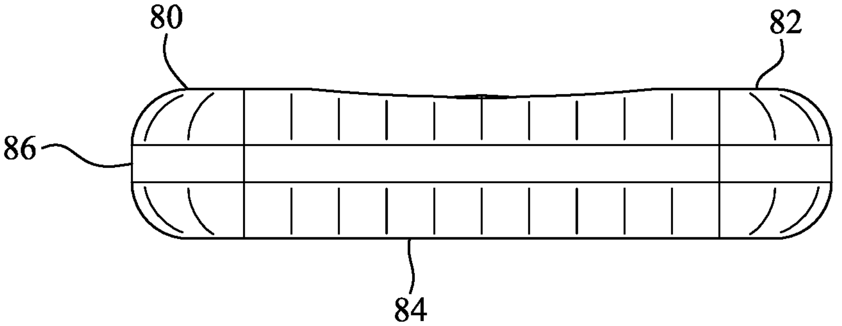
FIG. 18 is a bottom view of FIG. 13.
Figure 19:
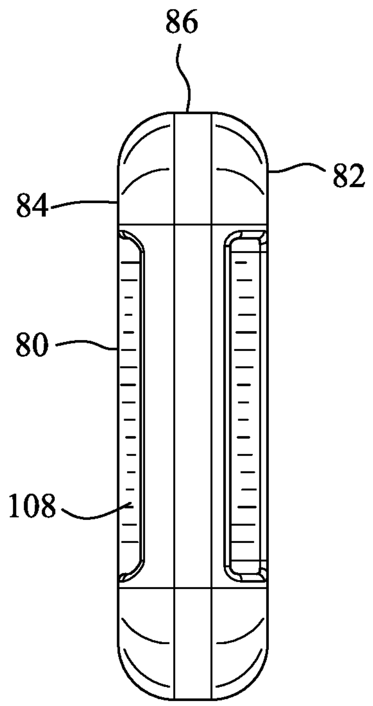
FIG. 19 is a left side view of FIG. 13.
Figure 20:
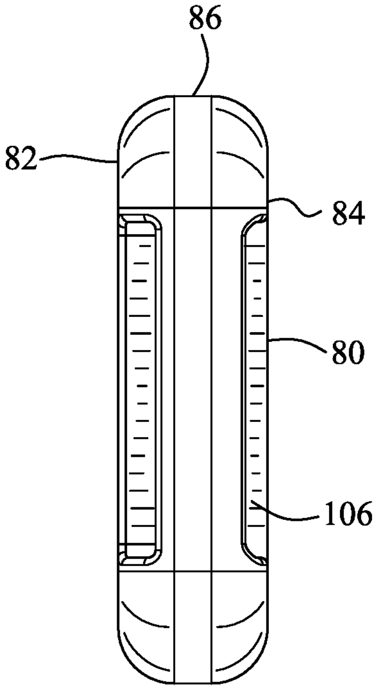
FIG. 20 is a right side view of FIG. 13.
Figure 21:
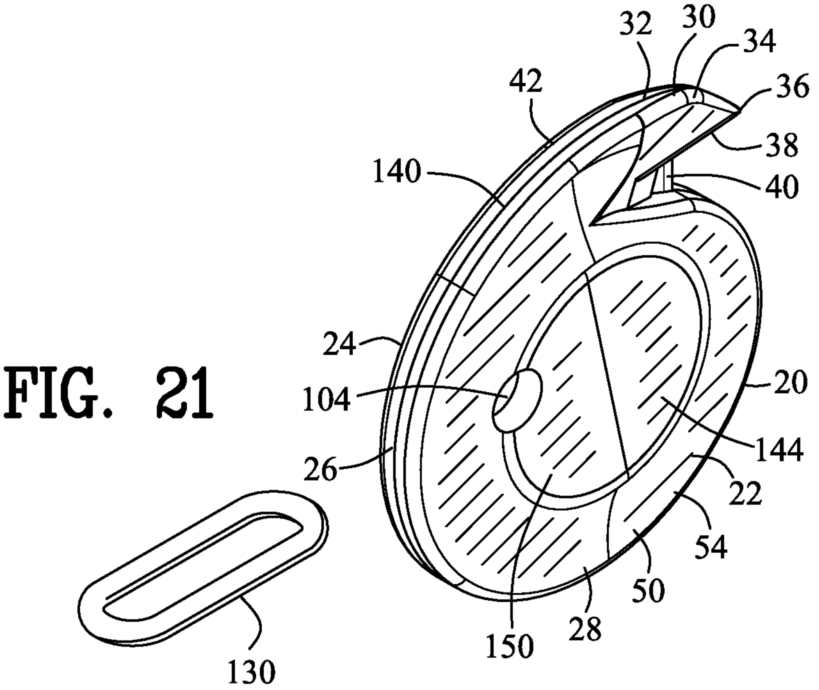
FIG. 21 is an isometric view of the body in FIG. 1.
Figure 22:
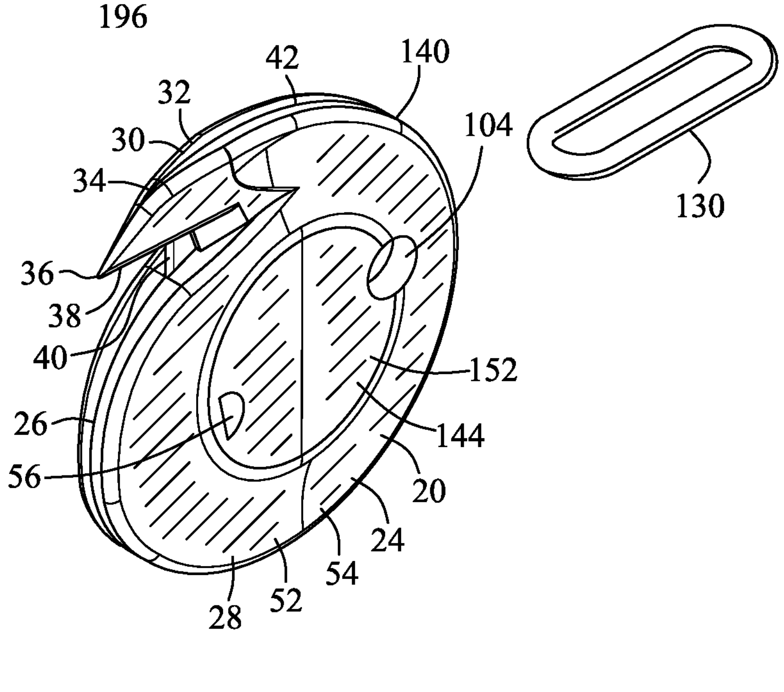
FIG. 22 is a rear isometric of FIG. 21.
Figure 23:
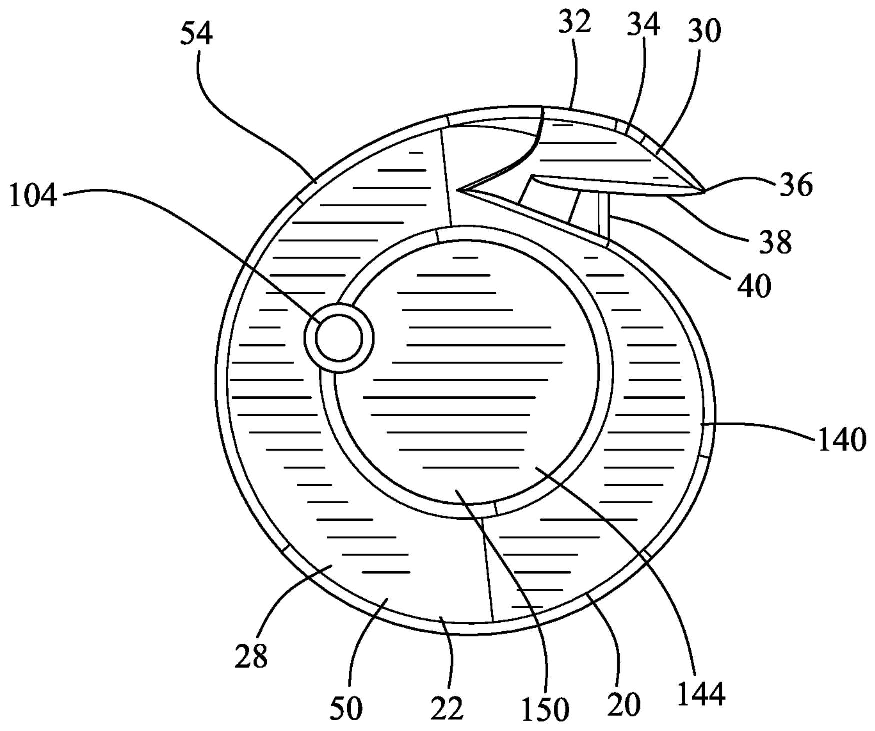
FIG. 23 is a front view of FIG. 21.
Figure 24:
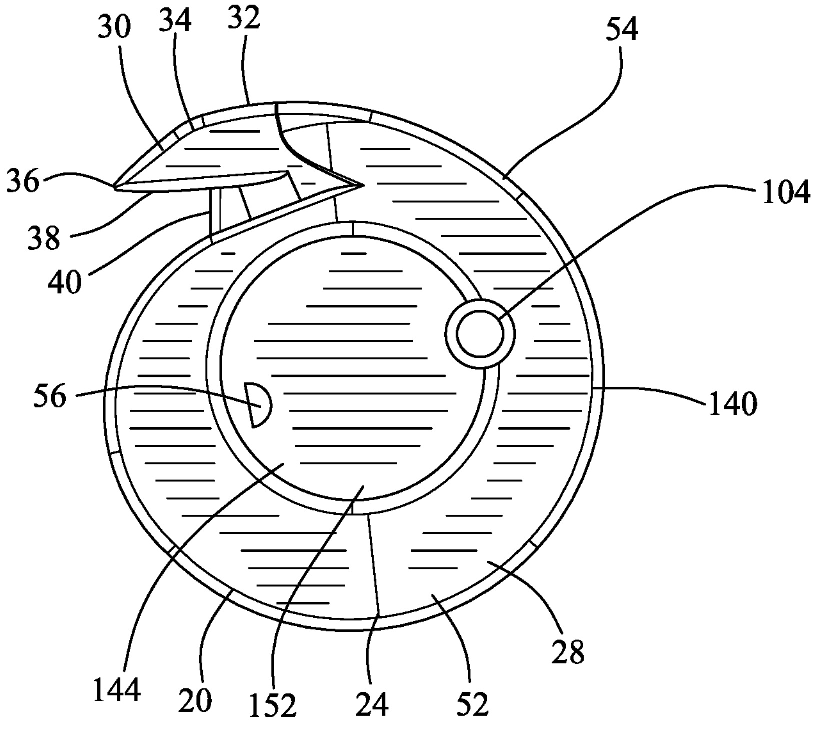
FIG. 24 is a rear view of FIG. 21.
Figure 25:
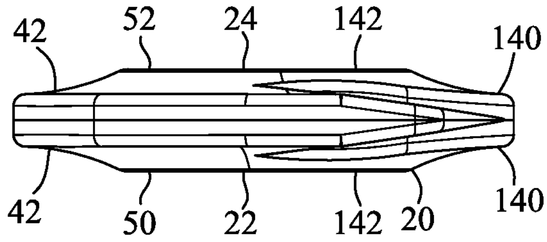
FIG. 25 is a top view of FIG. 21.
Figure 26:
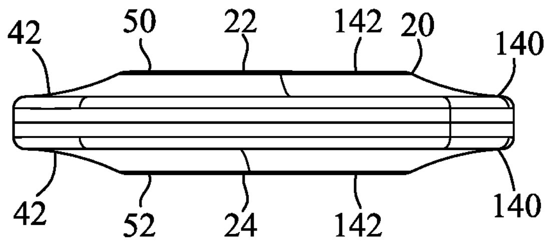
FIG. 26 is a bottom view of FIG. 21.
Figure 27:
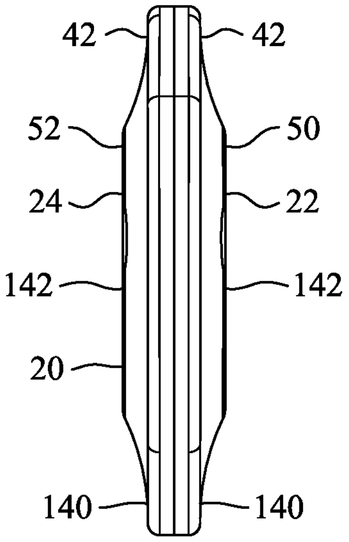
FIG. 27 is a left side view of FIG. 21.
Figure 28:
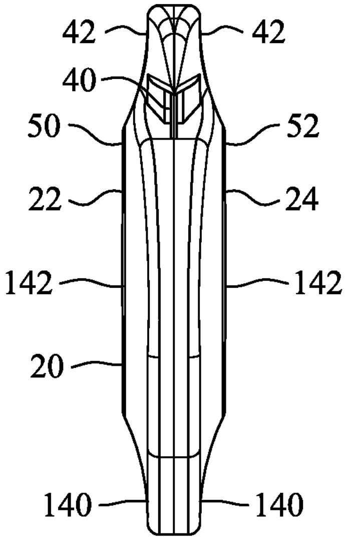
FIG. 28 is a right side view of FIG. 21.
Figure 29:
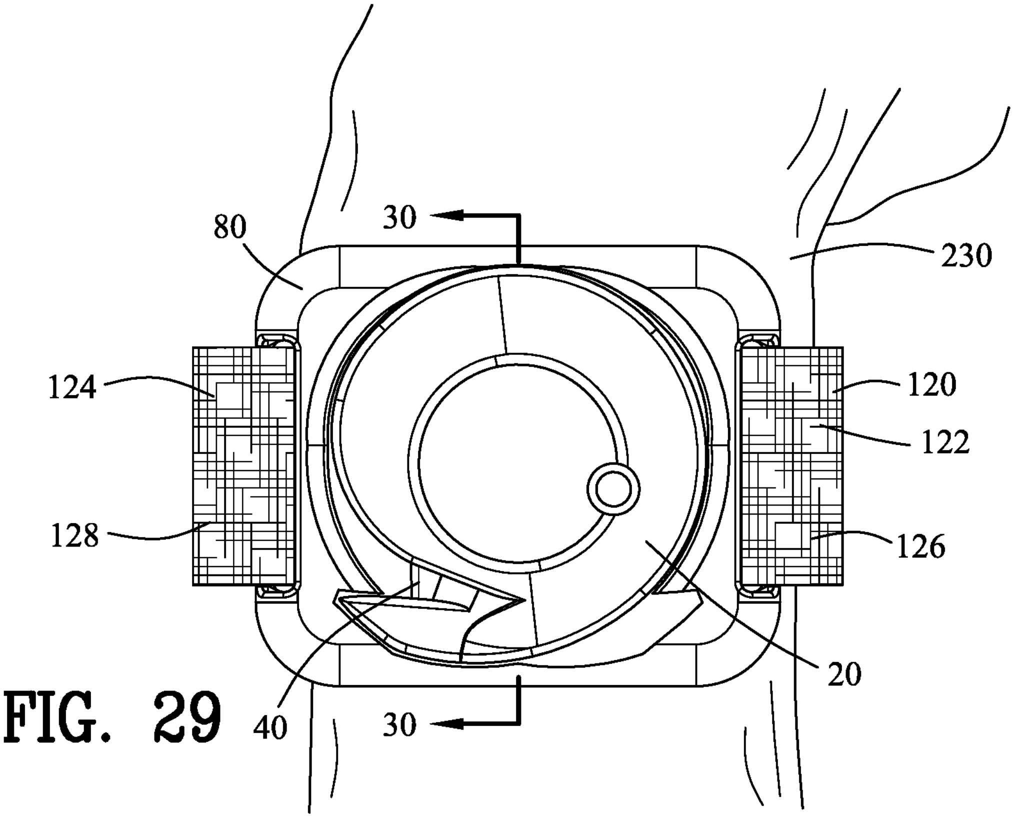
FIG. 29 is a view similar to FIG. 2 illustrating a band coupling the holder to a wrist of an individual.
Figure 30:
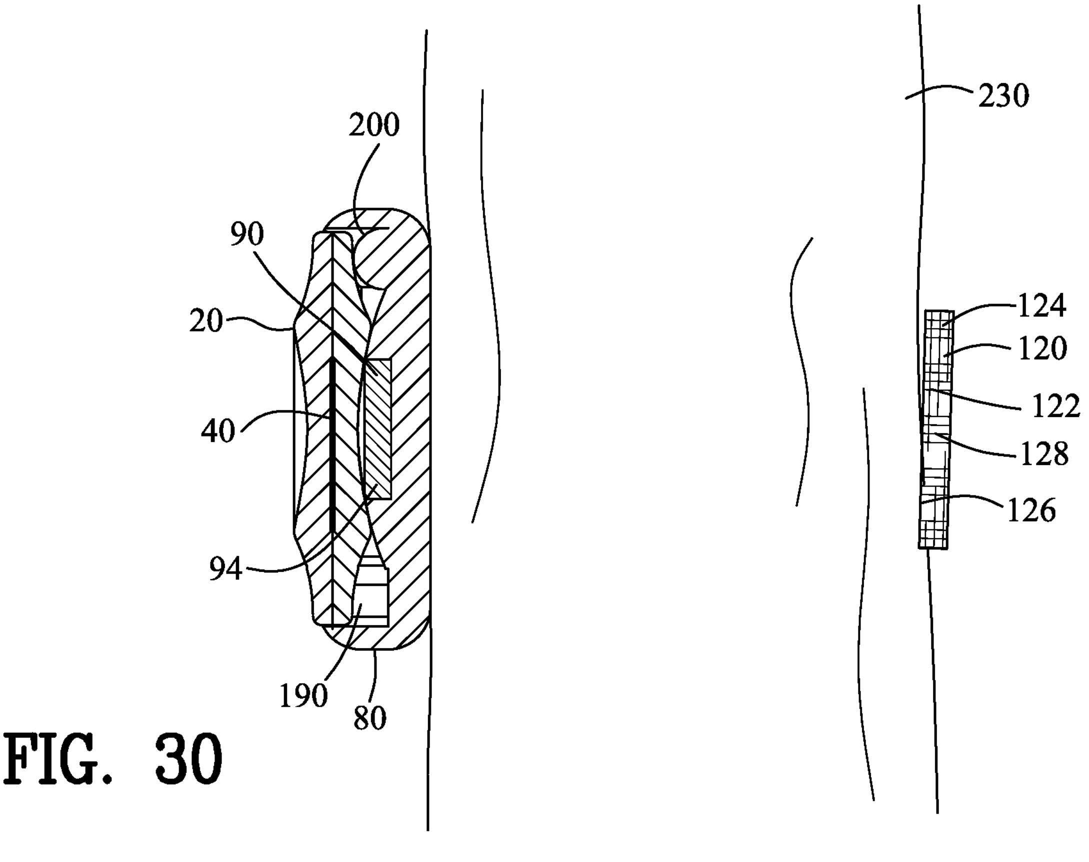
FIG. 30 is a sectional view along line 30-30 in FIG. 29.

FIGS. 1-37 illustrate a cutter and holder apparatus 10 for cutting an object 12. As shown in FIGS. 36 and 37 the object may include a container 14 such as a cardboard box 16 that is sealed with packing tape 18. Alternatively, the object 12 may include other objects such as paper products, plastic products, metallic products, polymeric products or other items that prior cutting.

The cutter and holder apparatus 10 comprises a body 20 having a first side 22, a second side 24 and an edge 26. The body 20 may include a circular body 28. Alternatively, the body 20 may include square, rectangular, curved or other geometric shapes. The body 20 may be constructed from natural fiber material, polymeric material, metallic material, carbon fiber material, a composite material or other rigid materials.

An insert leg 30 is coupled to the body 20. The insert leg 30 may include a tangential orientation 32 relative to the body 28. Preferably, the insert leg 30 includes a conical shaped rod 34 that extends to a pointed end 36. A channel 38 is defined between the body 20 and the insert leg 30 for positioning the insert leg 30 below the object 12 and the object 12 within the channel 38.

A blade 40 is coupled to the body 20 and is positioned within the channel 38 for cutting the object 12. More specifically, the blade 40 may be coupled to the body 20 and the insert leg 30 and is positioned within the channel 38 for cutting the object 12. The body 20, the insert leg 30 and the blade 40 may define a safety cutter device 42. The safety cutter device 42 shields the blade 50 from cutting any item or individual that is not inserted within the channel 38. As such the blade 50 is concealed between the body 20 and the insert leg 30 for preventing inadvertent cutting of an item or individual.

The body 20 and insert leg 30 may be constructed from a primary body 50 and a secondary body 52 that are independently constructed such as injection molded and thereafter coupled together with the blade 40 secured there between. Alternatively, the body 20 and the insert leg 30 may be constructed from an integral one piece unit 54 that is injected molded around the blade 50. In this method, the body 20 may include a D-shaped aperture 56 wherein the blade is supported during the injection molding process.

A body link 60 is coupled to the body 20. The body link 60 may include magnetic, mechanical, removable adhesive, hoop and loop or other linking devices. FIGS. 6, 8, 30, 32 and 34 illustrate the body 20 having a body chamber 62 for housing the body link 60 within the body 20. For example, the link chamber 62 may house a body magnet 64 or body metal 66.

A base 80 has a first side 82, a second side 84 and an edge 86. A base link 90 is coupled to the base 80. The base link 90 may include magnetic, mechanical, removable adhesive, hoop and loop or other linking devices. FIGS. 6, 8, 30, 32 and 34 illustrate the base 80 having a base chamber 92 for housing the base link 90 within the base 80. For example, the base chamber 92 may house a base magnet 94 or base metal 96.

The body 20 is positioned adjacent to the base 80 and the body link 60 couples with the base link 90 for defining a removable couple 100 and temporarily coupling the body 20 with the base 80. For example, the removable couple 100 may include a body metal 66 engaged within the body chamber 62 and a base magnet 94 engaged within the base chamber 92 for creating a magnetic couple 102 upon positioning the body 20 adjacent to the base 80. Alternatively, the removable couple 100 may include a first hook and loop 66 engaged within the body chamber 62 and a base hook and loop engage within the base chamber 92 for creating a mechanical couple.

The base 80 may include a first base aperture 106 and a second base aperture 108. A keeper 120 is coupled with the base. More specifically, the keeper 120 may engage within the first base aperture 106 and the second base aperture 108. The keeper 120 may include a band 122, a wristband 124, a waistband 126 or an armband 128. As such the cutter and holder device 10 may be conveniently transported on an individual and conveniently utilized wherein the body 20 is quickly removed from the base 80 and reinserted into the base 80. For example, the wristband 124 may be utilized for coupling the cutter and holder device 10 to the arm 230 of an individual.

The body 20 may further include a tether aperture 104 for receiving a tether 130. As such the cutter and holding device 10 may be conveniently transported on an individual by encircling the tether 130 around the neck, arm or coupled to an article of clothing and conveniently utilized wherein the body 20 is quickly removed from the base 80 and reinserted into the base 80.

The body 20 may include a body key 140. The base 80 may include a base receptacle 180. The body key 140 engages with the base receptacle 180 for defining an alignment platform 220. The alignment platform 220 aligns the body 20 with the base 80 and positions the body link 60 proximate to the base link 90.

The base receptacle 180 may include a leg receptacle 182 for receiving the insert leg 30 of the body 20. The engagement of the insert leg 30 within the leg receptacle 182 further defines the alignment platform 220 and further assists in aligning the body 20 with the base 80 and positions the body link 60 proximate to the base link 90.

Furthermore, the base receptacle 180 may include a second leg receptacle 184 for receiving the insert leg 30 of the body 20 and permitting the body 20 to be positioned in multiple orientations within the base 80. The multiple orientations of the body 20 within the base 80 may prove advantageous in that the cutter and holder apparatus 10 can be worn on either the left appendages of an individual or the right appendages of the individual wherein the body 20 has a more correct orientation for withdrawing the body 20 from the base 80 and having the blade 40 in the correct orientation for quick utilization for cutting the object 12.

The body 20 includes a body protruded surface 142. The base 80 includes a base recessed surface 186. The body protruding surface 142 abuts with the base recessed surface 186 for positioning a portion of the body 20 within the base 80 and defining a low profile exterior surface 222 as best shown in FIGS. 6, 8-12, 30 and 34. More specifically, the body may include a concave body surface 144. The base 80 may include a convex base surface 188. The concave body surface 144 abuts with the convex base surface 188 for positioning a portion of the body 20 within the base 80 and defining the low profile exterior surface 222 as best shown in FIGS. 6, 8-12, 30 and 34.

Figure 31:
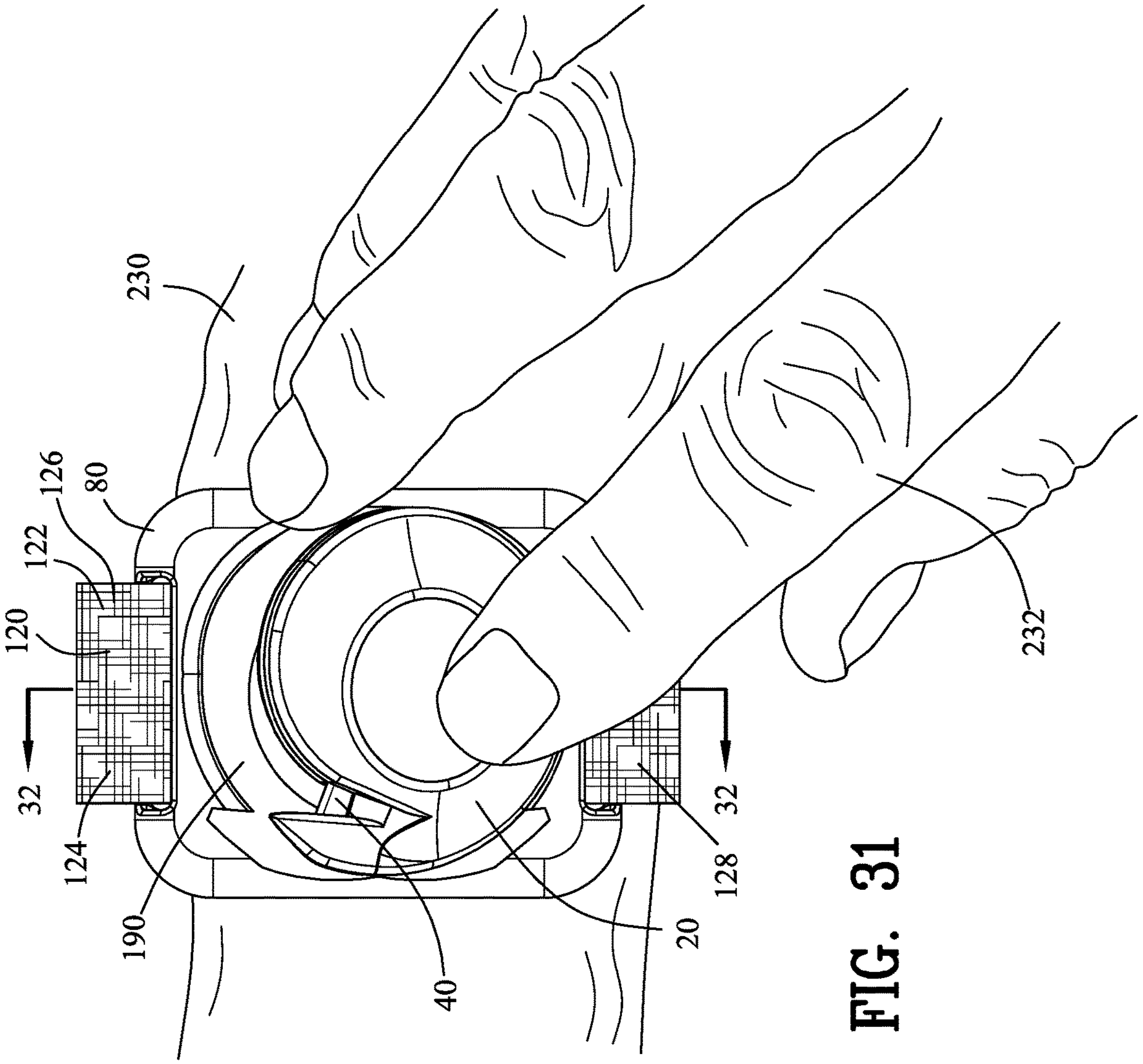
FIG. 31 is a view similar to FIG. 29 illustrating the body being depressed into the base for elevating a portion of the body from the base and allowing grasping of the body.
Figure 32:
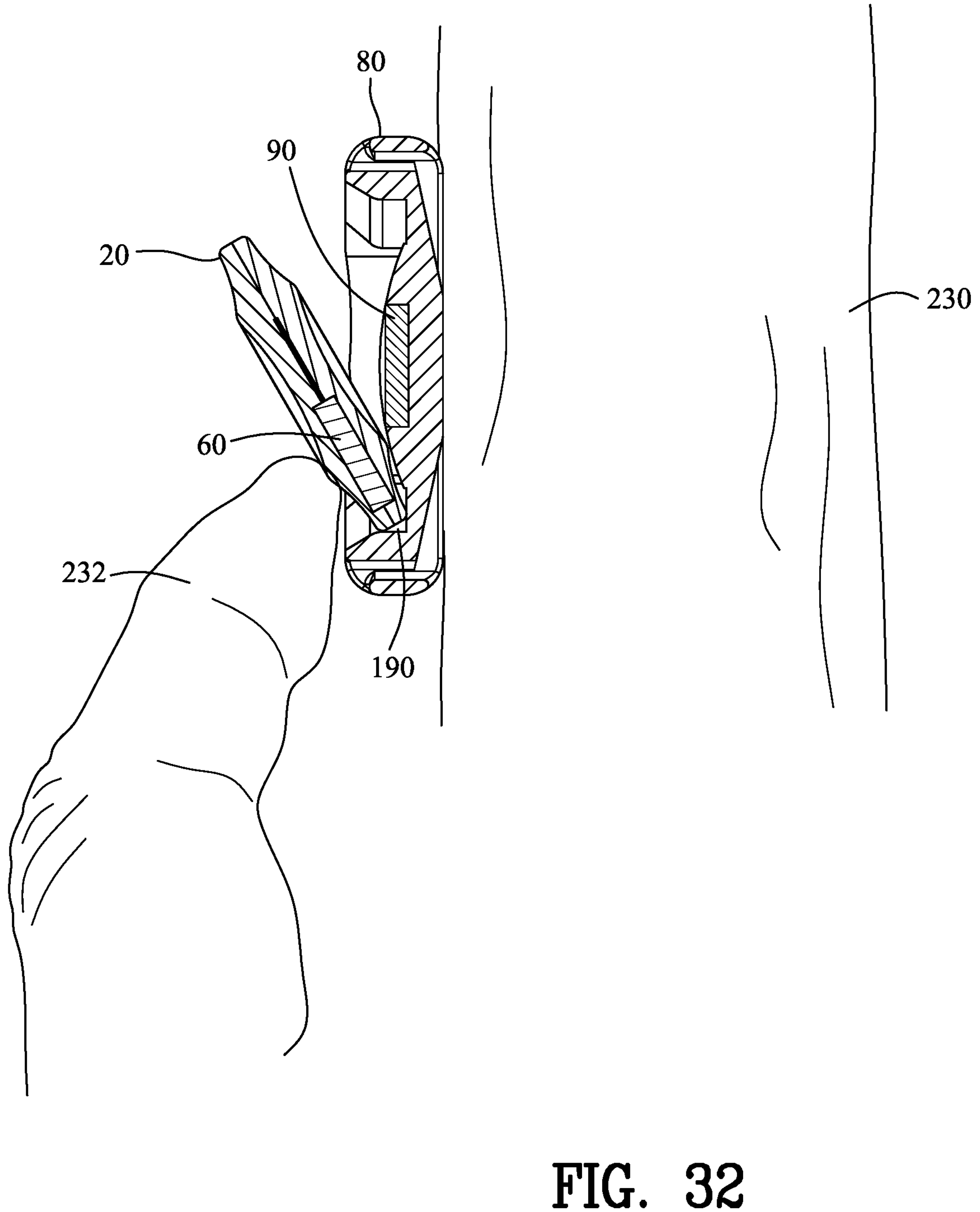
FIG. 32 is a sectional view along line 32-32 in FIG. 31.

A groove 190 may be located in the base. The groove 190 defines a cavity 192 between the body 20 and the base 80 during engagement of the body 20 with the base 80. As best shown in FIGS. 31 and 32, the cavity 192 receives a portion of the body 20 for elevating a portion of the body 20 from the first side 82 of the base 80 and allows grasping of the body 20. More specifically, the finger 232 of an individual may apply a downward force upon the body 20 adjacent to the edge 26. This force displaces a portion of the body 20 into the cavity 192 resulting in the elevation of the opposite edge 26 of the body 20 from the base 80. This elevation of the opposite edge 26 of the body 20 results in exposure of the body 20 from the base 80 and makes grasping of the body 20 with the other hand of the individual more convenient and efficient.

The groove 190 may define an annular shaped groove 194. The annular shaped groove 194 defines an annular shaped cavity 196 between the body 20 and the base 80 during engagement of the body 20 with the base 80. The annular shaped cavity 196 permits the body 20 to be depressed into the annular shaped cavity 196 in multiple locations for elevating a portion of the body 20 from the first side 82 of the base 80 and allowing grasping of the body 20.

Figure 33:
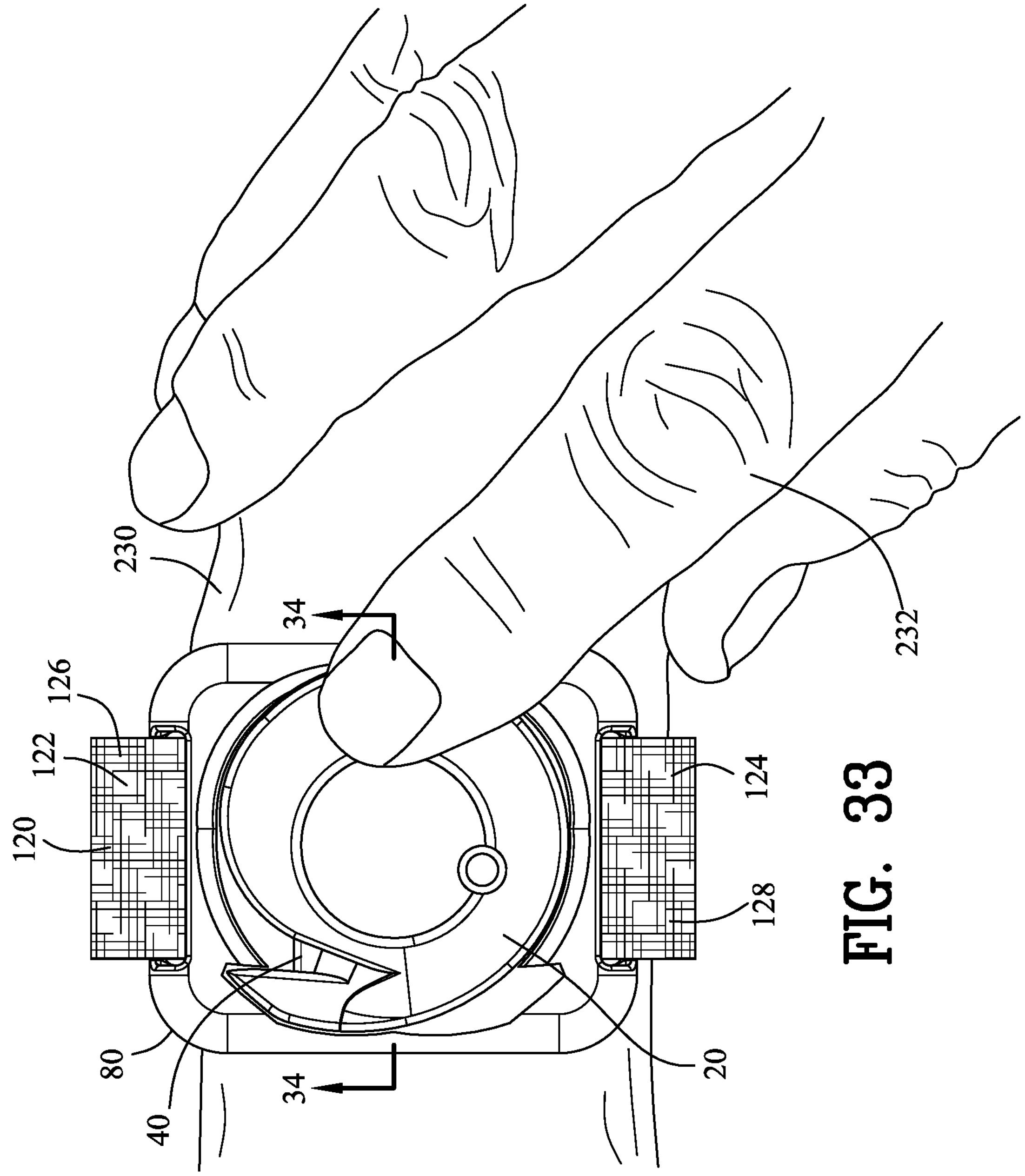
FIG. 33 is a view similar to FIG. 29 illustrating a preventer inhibiting the body from being depressed into the base and preventing the elevation of the body from the base.
Figure 34:
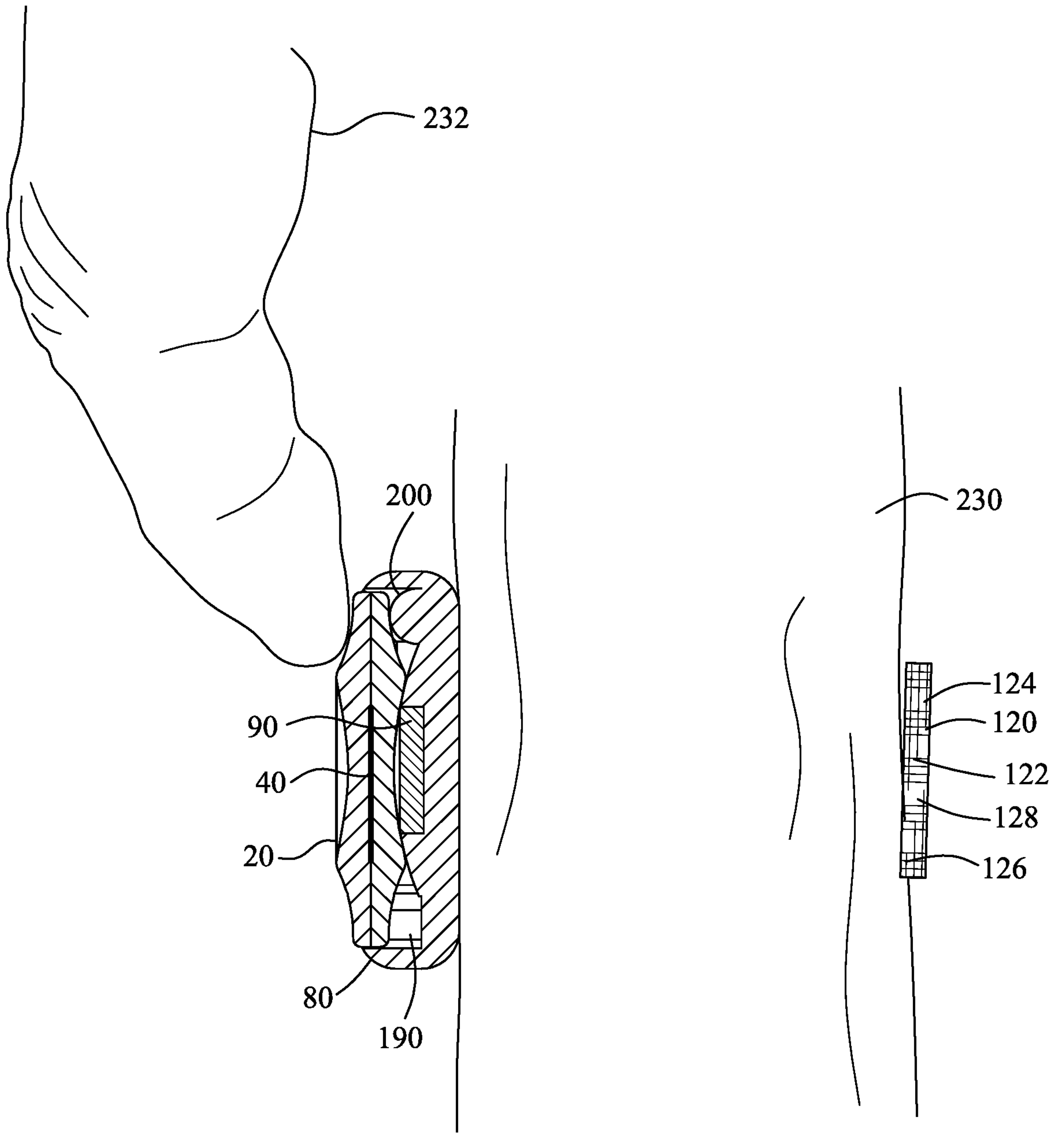
FIG. 34 is a sectional view along line 34-34 in FIG. 33.

A preventer 200 may be coupled to the base 80 and extend into the cavity 192. As best shown in FIGS. 33 and 34, the preventer 200 contacts the body 20 and inhibits the body 20 to be depressed into the cavity 192 in proximity to the preventer for preventing inadvertent disengagement between the body from the base. More specifically, if the finger 232 of an individual or other object applies a downward force upon the body 20, that is above the preventer 200, the preventer 200 will prevent this force from displacing the body 20 into the cavity 192 and resulting in a non-elevation of the opposite edge 26 of the body 20 from the base 80. Preferably, the base 80 is positioned such that the preventer 200 is on the leading side of the base 80. As such, the preventer 200 serves as a safety mechanism to prevent the inadvertent removal of the body 20 from the base 80 if a downward force is applied to the leading edge of the body 20. The preventer 200 may include a knob 202 extending into the cavity 192. The knob 202 may include a spherical dome 204.

Figure 35:
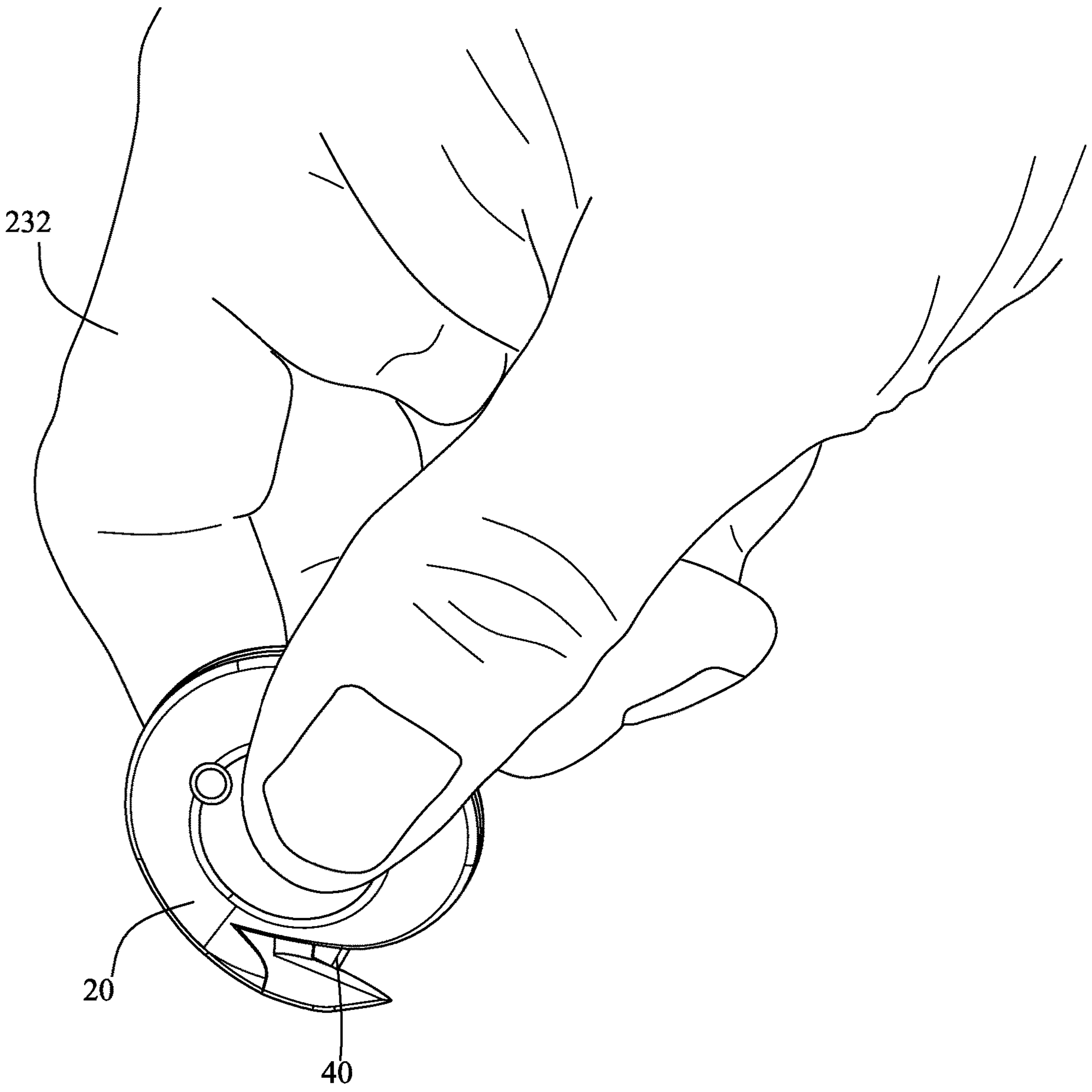
FIG. 35 is a view similar to FIG. 21 illustrating the body being handled by an individual.
Figure 36:
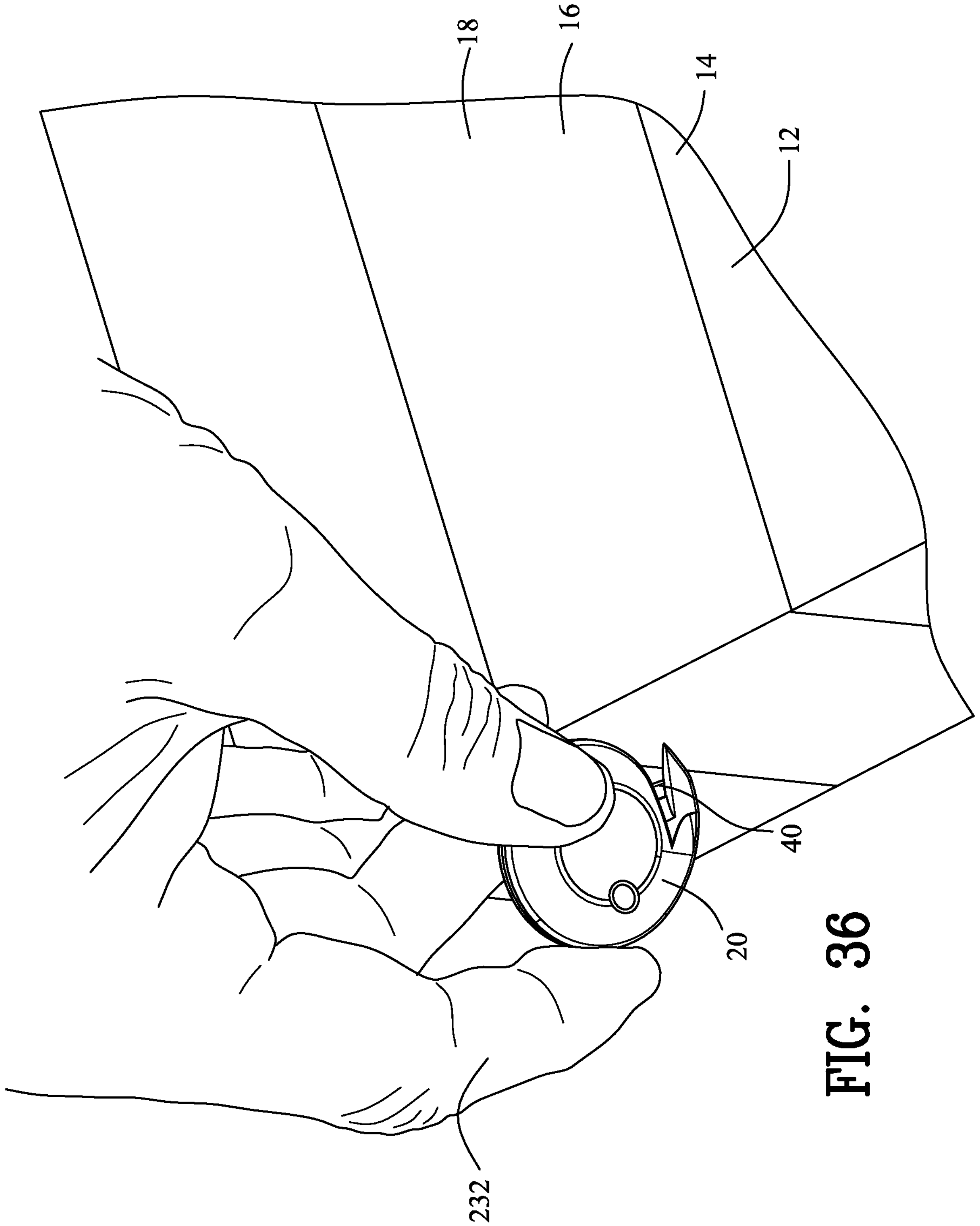
FIG. 36 is a view similar to FIG. 35 illustrating the body positioned adjacent to an object.
Figure 37:
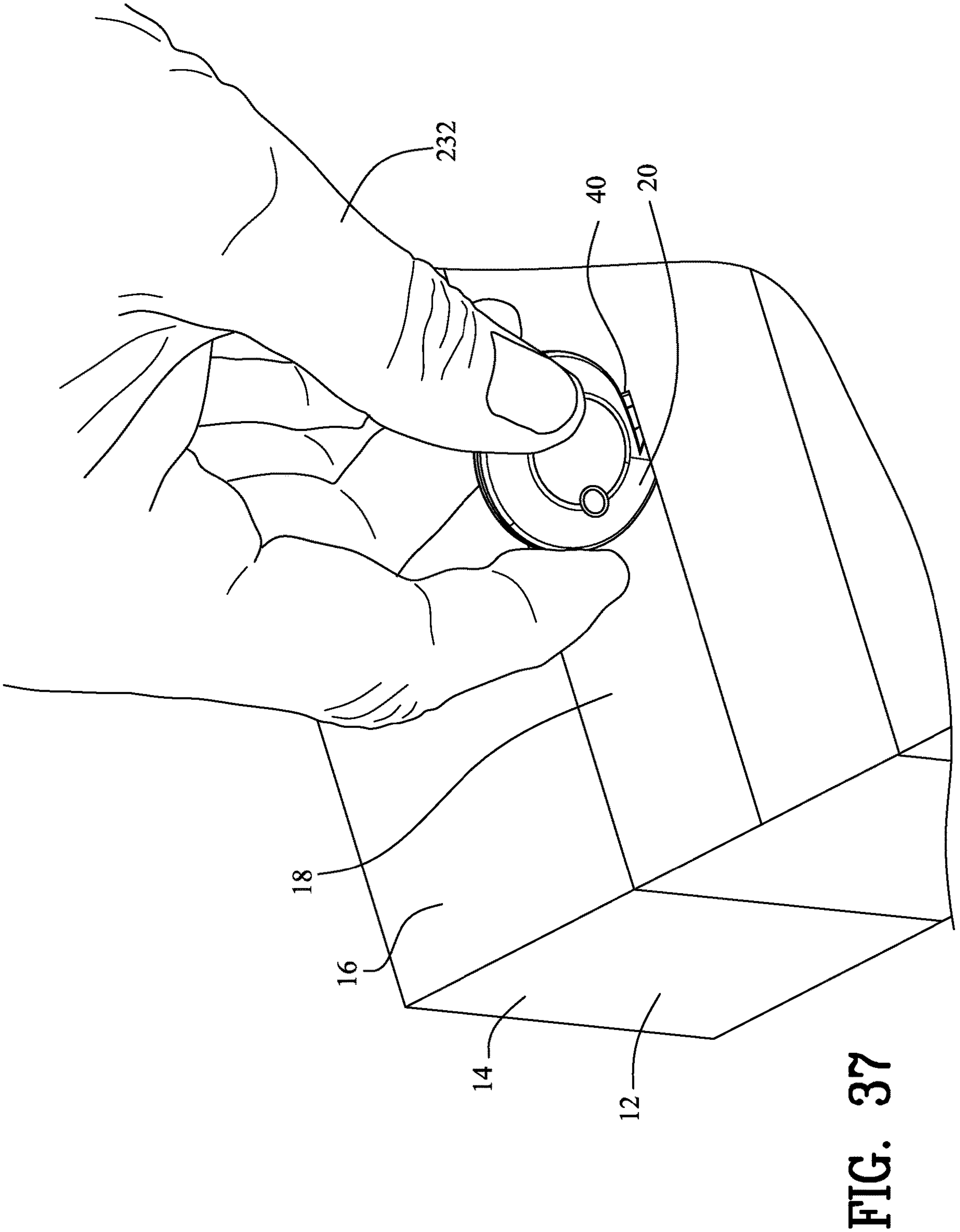
FIG. 37 is a view similar to FIG. 36 illustrating the body cutting the object.

As best shown in FIGS. 35 and 36, the body 20 may include a body recess 150 in the first side 22 of the body 20 for facilitating the handling of the body 20. More specifically, the body 20 may include a first body recess 150 in the first side 22 of the body 20 and a second body recess 152 in the second side 24 of the body 20 for facilitating the handling of the body 20.

The cutter and holder apparatus 10 may be utilized for providing a safe and convenient means for storing and transporting the body 20. In addition, the cutter and holder apparatus 10 may be utilized for conveniently withdrawing the body 20 from the base 80. The cutter and holder apparatus 10 may prevent the inadvertent or accidental separation of the body 20 from the base 80 by the preventer 200. Furthermore, the cutter and holder apparatus 10 may be utilized for providing a safe and effective means for cutting the object 12 with the body 20. Finally, the cutter and holder apparatus 10 may be utilized for conveniently repositioning the body 20 within the base 80.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A cutter and holder apparatus for cutting an object, comprising:

a body having a first side, a second side and an edge;

an insert leg coupled to said body;

a channel defined between said body and said insert leg for positioning said insert leg below the object and the object within said channel;

a blade coupled to said body and positioned within said channel for cutting the object;

a body magnet coupled to said body;

a base having a first side, a second side and an edge;

a base magnet coupled to said base;

said body positioned adjacent to said base for said body magnet attracting with said base magnet and defining a magnetic couple and temporarily coupling said body with said base;

and a keeper coupled with said base.

2. A cutter and holder apparatus for cutting an object, comprising:

a body having a first side, a second side and an edge;

an insert leg coupled to said body;

a channel defined between said body and said insert leg for positioning said insert leg below the object and the object within said channel;

a blade coupled to said body and positioned within said channel for cutting the object;

a body metal coupled to said body;

a base having a first side, a second side and an edge;

a base magnet coupled to said base;

said body positioned adjacent to said base for said body metal attracting with said base magnet and defining a magnetic couple and temporarily coupling said body with said base;

and a keeper coupled with said base.

3. The cutter and holder apparatus as set forth in claim 2, wherein said base receptacle includes a second leg receptacle for receiving said insert leg of said body and permitting said body to be positioned in multiple orientations within said base.

4. The cutter and holder apparatus as set forth in claim 2, wherein said body includes a body protruded surface;

said base includes a base recessed surface; and said body protruding surface abutting with said base recessed surface for positioning a portion of said body within said base and defining a low profile exterior surface.

5. The cutter and holder apparatus as set forth in claim 2, wherein said body includes a concave body surface;

said base includes a convex base surface; and said concave body surface abutting with said convex base surface for positioning a portion of said body within said base and defining a low profile exterior surface.

6. The cutter and holder apparatus as set forth in claim 2, further including a groove in said base;

said groove defining a cavity between said body and said base during engagement of said body with said base; and said cavity receiving a portion of said body for elevating a portion of said body from said first side of said base and allowing grasping of said body.

7. The cutter and holder apparatus as set forth in claim 6, wherein said groove defines an annular shaped groove;

said annular shaped groove defining an annular shaped cavity between said body and said base during engagement of said body with said base; and said annular shaped cavity permitting said body to be depressed into said annular shaped cavity in multiple locations for elevating a portion of said body from said first side of said base and allowing grasping of said body.

8. The cutter and holder apparatus as set forth in claim 6, further including a preventer coupled to said base and extending into said cavity; and said preventer contacting said body and inhibiting said body to be depressed into said cavity in proximity to said preventer for preventing inadvertent disengagement between said body from said base.

9. The cutter and holder apparatus as set forth in claim 8, wherein said preventer includes a knob extending into said cavity.

10. The cutter and holder apparatus as set forth in claim 2, wherein said keeper includes a band.

11. The cutter and holder apparatus as set forth in claim 2, wherein said body includes a body chamber;

said body metal positioned within said body chamber of said body; and said body includes a magnetic.

12. The cutter and holder apparatus as set forth in claim 2, wherein said base includes a base chamber; and said base magnet positioned within said base chamber of said base; and said base includes a magnet.

* * * * *